United States Patent [19]

Zwirn

[11] Patent Number: 4,532,548
[45] Date of Patent: Jul. 30, 1985

[54] RESOLUTION ENHANCEMENT AND ZOOM

[75] Inventor: Robert Zwirn, Los Angeles, Calif.

[73] Assignee: Hughes Aircraft Company, El Segundo, Calif.

[21] Appl. No.: 461,298

[22] Filed: Jan. 27, 1983

[51] Int. Cl.³ ............................................. H04N 5/14
[52] U.S. Cl. .................................... 358/166; 382/42; 382/54
[58] Field of Search .................. 358/166, 167, 36, 37; 382/42, 54

[56] References Cited

U.S. PATENT DOCUMENTS

| | | | |
|---|---|---|---|
| 4,330,833 | 5/1982 | Pratt | 358/166 |
| 4,402,006 | 8/1983 | Karlock | 358/166 |
| 4,463,381 | 7/1984 | Powell | 358/166 |

*Primary Examiner*—Michael A. Masinick
*Attorney, Agent, or Firm*—Mark J. Meltzer; A. W. Karambelas

[57] ABSTRACT

In this invention, the resolution is enhanced first by effectively decreasing the scan angle subtended between adjacent samples significantly below that of the Rayleigh limit to obtain an image blurred by the point spread function (or diffraction pattern) of the aperture. The next step is to process this blurred image at least to partially remove the blur. The unblurring process consists of correlating each small segment of the blurred image with blurred images of preconstructed image primitives and then synthesizing a new image comprising a mosaic of spatially correlated original (unblurred) primitives. The blurred images of the primitives are obtained from a complete set of image primitives comprising, ideally, all possible unblurred primitive shapes. These primitives are then blurred by convolution with the point spread function of the aperture of the imager.

10 Claims, 11 Drawing Figures

RESOLUTION ENHANCEMENT AND ZOOM

BACKGROUND OF THE INVENTION

Image systems including television cameras, charge coupled device imagers, forward looking infrared sensors, and infrared charge coupled device detectors produce a video image having a resolution limited by the sampling rate of the imager. Designers of such systems typically limit the sampling rate to slightly more than two samples between the first zeros of the diffraction blur in accordance with the Nyquist criteria. The Rayleigh resolution limit (computed from the size of the aperture and the wavelength of the sense energy) describes the limits of what the eye can see. A discussion of the Rayleigh limit is given in Jenkins and White, *Fundamentals of Optics*, McGraw-Hill, 1957, at page 304. Specifically, a minimum angle of resolution between two points, for an imager having a circular aperture of diameter D sensing light wavelength $\lambda$, is $0.244\lambda/D$ radians. Accordingly, scanning imager systems are typically designed so that scan angle subtended between adjacent samples is less than $0.122\lambda$ radians.

SUMMARY OF THE INVENTION

In this invention, the resolution of an object is enhanced first by effectively decreasing the scan angle subtended between adjacent samples to well below that of the Rayleigh limit to obtain a better estimate of an image blurred by the point spread function (or diffraction pattern) of the aperture. The next step is to process this blurred image at least to partially remove the blur. The unblurring process consists of correlating each small segment of the blurred image with blurred images of preconstructed image primitives and then synthesizing a new silhouette image comprising a mosaic of spatially correlated members of the original (unblurred) primitive set. The blurred images of the primitives are obtained from a complete set of image primitives comprising, ideally, all possible primitive shapes. These primitives are blurred by convolution with the point spread function of the aperture of the imager.

In one embodiment of the invention, the increase in sampling rate, beyond the Rayleigh limit in a conventional imager having its sampling rate limited by the Rayleigh criterion, is achieved by using multiple image registration. This technique allows the present invention to be used on existing imaging systems. In the multiple image registration of this invention, a single multiple-registered video frame, consisting of a plurality of subpixels of reduced area, is constructed from a plurality of normal video frames, each comprising a plurality of standard pixels. The image motion or camera jitter between subsequent normal video frames determines the subpixel displacement in the multiple-registered video frame. Implementation of multiple-image registration in already existing system hardware may be accomplished using a correlation tracker, or image motion compensating servo error or camera platform stabilizing gyro error. The subpixel displacement is determined in this way.

In another embodiment of the invention, the number of samples in a given angle of scan in a conventional imager may be increased by using image interpolation and zoom. Image interpolation and zoom is useful when there is not enough time to process a plurality of video frames to construct a multiple-registered video frame. Another technique is to use smaller sized detectors in order to achieve dense sampling in a single frame.

DESCRIPTION OF THE FIGURES

The invention may be understood by reference to the accompanying drawings, of which:

FIG. 1b illustrates the diffraction pattern or point spread function corresponding to FIG. 1a;

FIG. 2b illustrates a sub-pixel mosaic synthesized from the four multiple-registered video frames of FIG. 2a;

DETAILED DESCRIPTION OF THE INVENTION

Figure 1A:
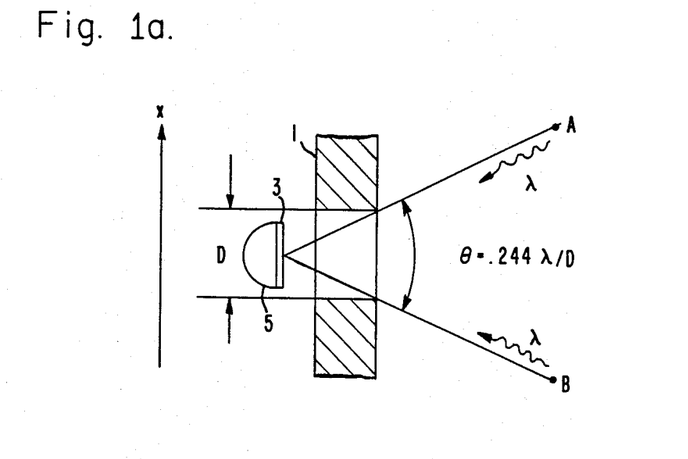
FIG. 1a illustrates a typical aperture and sensor receiving light from two point sources.

FIG. 1a is a simplified schematic diagram illustrating two points A, B viewed through a circular aperture 1 (shown in cross-section) of diameter D by a lens 3 of a camera 5 senses the radiation of wavelength $\lambda$ emitted or reflected from the two points A and B. The angle $\theta$, subtended between the two points A and B at the lens 3, is equal to the Rayleigh limit $0.244\lambda/D$.

Figure 1B:
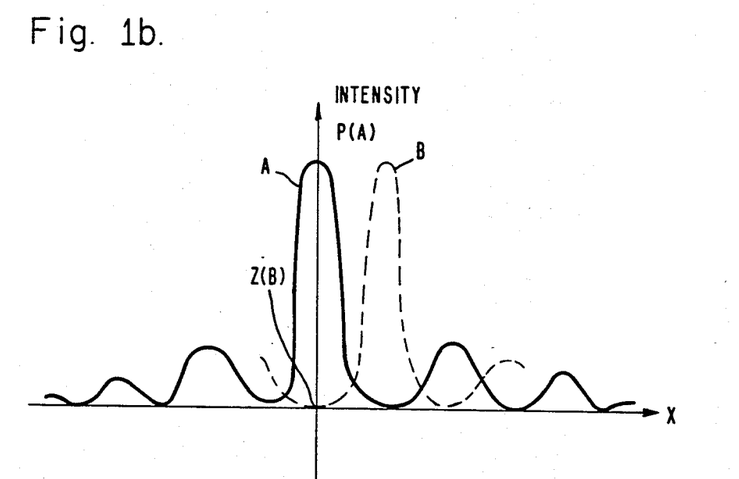

FIG. 1b is a diagram illustrating the corresponding diffraction patterns produced at the lens 3 by the radiation from point A (solid line) and from point B (dashed line) in which the ordinate corresponds the photon intensity and the abscissa corresponds the position along the X axis of FIG. 1a. Such diffraction patterns of point source images are uniquely characteristic of the aperture, and are termed "Point Spread Functions".

The Rayleigh criterion establishes the resolution limit of two points viewed through an aperture. Specifically, the Rayleigh criterion states that the minimum perceptible separation between the two points A and B occurs where the peak P(A) of the diffraction blur of one point corresponds to the first zero Z(B) of the diffraction blur of the other point. This is exactly the condition illustrated in FIG. 1b. This criterion is based upon the fact that, below this separation, there is no longer a discernable diffraction valley between the peaks. However, it is a principle of this invention that the Rayleigh criterion relates to the behavior of the human eye and is not a fundamental limit on the resolution of an image viewed through a particular aperture and, in fact, a greater resolution is possible if processing is used. Specifically, the shape of the blurred image of two points, whose separation is precisely at the Rayleigh limit, is different from that of a single point. Furthermore, the blurred image of the two points continues to go through subtle changes below the Rayleigh limit until the two points actually coincide in the scene. (Of course, upon coincidence they are definitely unresolvable.) Accordingly, there is realizable information contained in a blurred image of two points separated by a distance below that of the Rayleigh criterion. Extraction of this information is accomplished in the present invention.

Multiple Image Registration

Figure 2A:
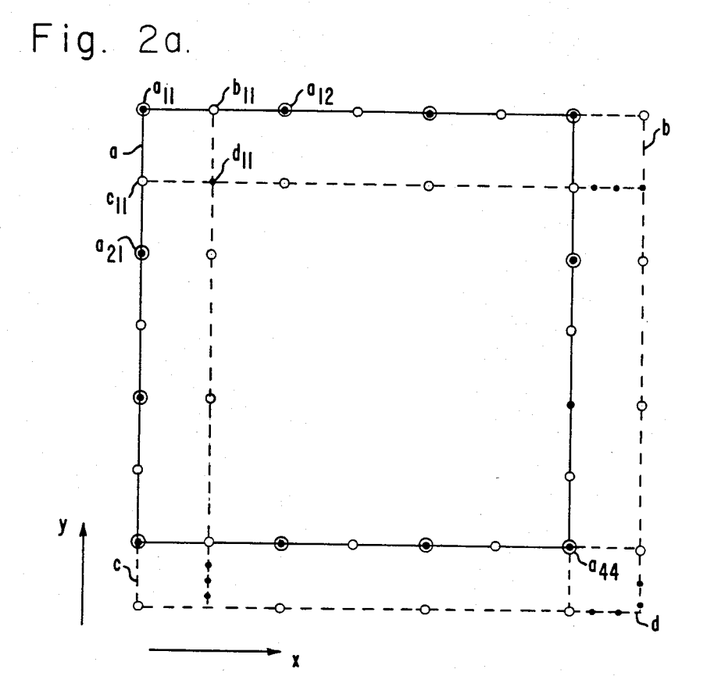
FIG. 2a illustrates four multiple-registered video frames.
Figure 2B:
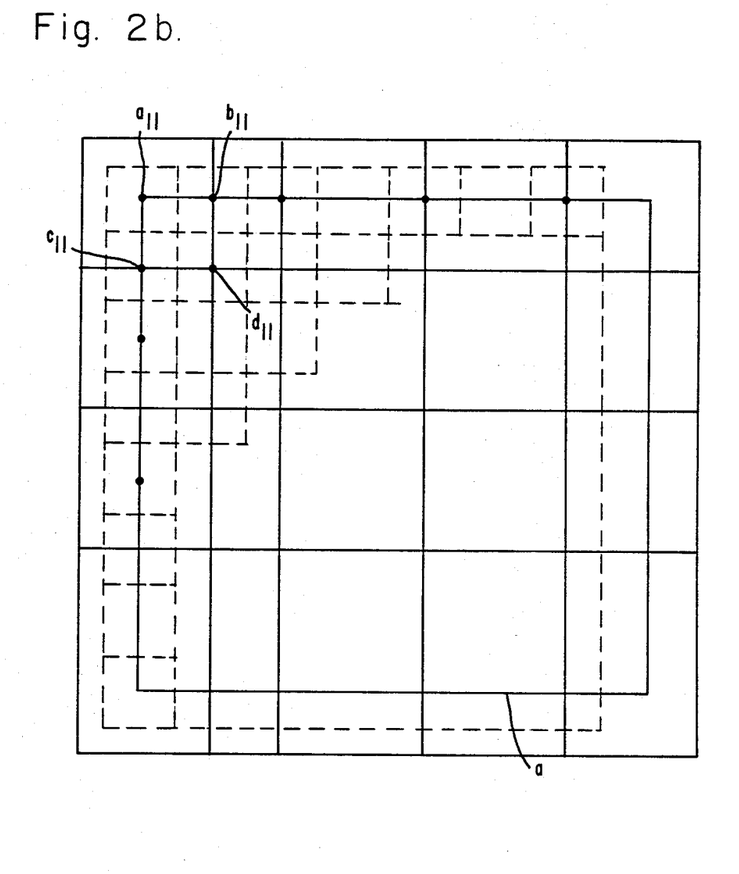

FIGS. 2a and 2b illustrate the multiple image registration used in this invention with the simple example of a video frame having only sixteen pixels, four on each side. In FIG. 2a, a video frame "a", bounded by the solid line whose corners are denoted $a_{11}$, $a_{14}$, $a_{41}$ and $a_{44}$, comprises sixteen pixels each centered around sixteen respective points $a_{ij}$. The location of each of the center points symbolized as $a_{ij}$ of the sixteen pixels is illustrated in FIG. 2a while the mosaic of the corresponding pixels themselves is illustrated in FIG. 2b in solid line.

Multiple image registration is achieved by sampling and storing the sixteen pixels of data comprising the video frame a of FIG. 2a illustrated in solid line. Then the camera 5 is displaced in the x direction so as to sample a second video frame b illustrated in dashed line comprising sixteen pixels $b_{ij}$ and bounded by pixels $b_{11}$, $b_{14}$, $b_{41}$ and $b_{44}$. The displacement in the x direction between the video frames a and b is equal to half the distance between the center points $a_{11}$ and $a_{12}$. The sixteen pixels of data corresponding to the sixteen center points $b_{ij}$ are sampled and stored. The camera 5 is again displaced to sample a third video frame c bounded by pixels $c_{11}$, $c_{14}$, $c_{41}$ and $c_{44}$ in FIG. 2a. The video frame c is displaced from the original video frame a in the y direction by half the distance between the center points $a_{11}$ and $a_{21}$. The sixteen pixels corresponding to the sixteen center points $c_{ij}$ are then sampled and stored. The camera 5 is then displaced from the location corresponding to the video frame c in the x direction by a distance corresponding to half the pixel spacing to sense a fourth video frame d illustrated in FIG. 2a in dashed-dotted line whose corner pixels bear indicia $d_{11}$, $d_{14}$, $d_{41}$ and $d_{44}$. The sixteen pixels corresponding to the sixteen center points $d_{ij}$ of the video frame d are then sampled and stored.

A composite of the stored data from the video frames a, b, c and d is then formed by reorganizing the data in the order illustrated in FIG. 2b. Specifically, FIG. 2b illustates the data corresponding to the pixel center points $a_{11}$, $b_{11}$, $c_{11}$ and $d_{11}$ in a multiple-registered or composite video frame indicated in dashed line in FIG. 2b. Each of the points $a_{11}$, $b_{11}$, $c_{11}$ and $d_{11}$ is now the center of a corresponding subpixel illustated in dashed line in FIG. 2b. The number of subpixels in the resulting composite mosaic is equal to the square of the sampling improvement multiplied by the number of pixels in any one of the original video frames (in our example $2^2 \times 16 = 64$ subpixels). The dashed line subpixels of FIG. 2b are of smaller dimension than the solid line pixels by a factor of 2.

As a general rule, in a multiple registration of n video frames, the video frames are displaced from one another by a fraction $(1/n)^{\frac{1}{2}}$ of the pixel spacing. Thus, while FIG. 2b illustrates a multiple image registration of four video frames in which the pixel dimension is reduced by a factor of two, other reduction factors may be achieved by multiple image registration.

Even though the granularity of the video data has been reduced by the multiple image registration, the image represented by the data is nevertheless blurred in accordance with the point spread function of the aperture through which the image was viewed.

Figure 2C:
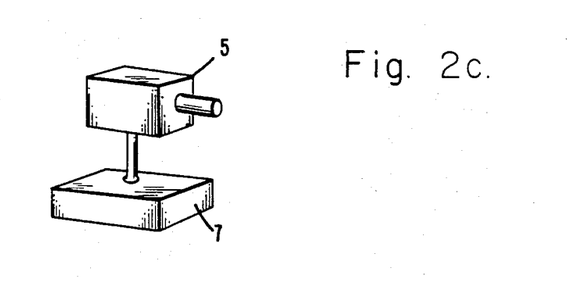
FIG. 2c illustrates an imaging device suitable for generating multiple-registered video frames.

In practice, correlation of the spatial displacement between video frames with the reorganization of the stored video data may be made by means of a camera or sensor 5 mounted on a controller 7 as indicated in FIG. 2c. The controller may be a camera gyroscopic stabilization platform whose gyro error may be automatically sensed and used as the video frame displacement. Alternatively, the platform 7 may be an image motion compensator using gyro stablization. Again, the gryo error would define the displacement between the subsequent video frames. Finally, a correlation tracker may be used to track the actual displacement due to camera jitter between video frames. Data from the correlation tracker would define the displacement between subsequent video frames. Each of these techniques is compatible with existing systems.

Figure 3:
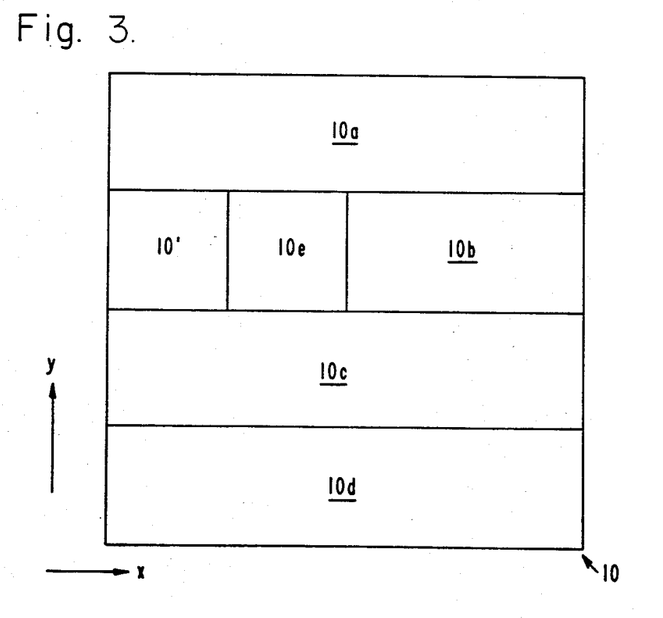
FIG. 3 illustrates a scheme for fast acquisition of multiple-registered video frames.

Referring to FIG. 3, a video frame 10 is synthesized by the multiple image registration of sixteen standard video frames of about 500 lines each, could not be entirely displayed on a standard video screen. Instead, the screen could accommodate only a small fraction 10' of the multiple-registered video image. Accordingly, the data residing in those portions 10a, 10c, and 10d of the video frame of FIG. 3 correspond to unnecessary scan excursions by the imager 5 in the Y direction. It is preferable in this invention to restrict the scan of the imager 5 of FIG. 2c in the Y direction to cover only the portion of 10 illustrated in FIG. 3 as 10', 10e, and 10b. In this way, data comprising the multiple-registered image 10' which is actually displayed on a television screen may be acquired about four times faster than otherwise for a 4-fold multiple registration.

Referring again to FIG. 2b, it should be recognized that each of the points $a_{ij}$, $b_{ij}$, $c_{ij}$, $d_{ij}$ corresponds to a word of video data which may be stored in the memory of a computer. The word corresponding to each of the points $a_{ij}$, $b_{ij}$, $c_{ij}$, $d_{ij}$ may take on any number in a range of values corresponding to an analog value of the radiation intensity sensed at that point by the camera 5. Alternatively, in a low performance system, each word may simply be a binary value (black or white, on or off). However, it is contemplated in this invention that each word represents an analog value corresponding to the intensity of radiation sensed by the imager at the corresponding center joint $a_{ij}$, $b_{ij}$, etc.

Image Interpolation and Zoom

It may not be possible to use multiple image registration to generate subpixel video data. This may occur, for example, when objects to be viewed in the scene are moving so fast in comparison with the rate at which subsequent video frames are generated, that there is insufficient correlation of the fast moving objects between subsequent video frames. In this special situation, image interpolation and zoom may be used to generate the subpixels, instead of multiple image registration.

Figure 4:
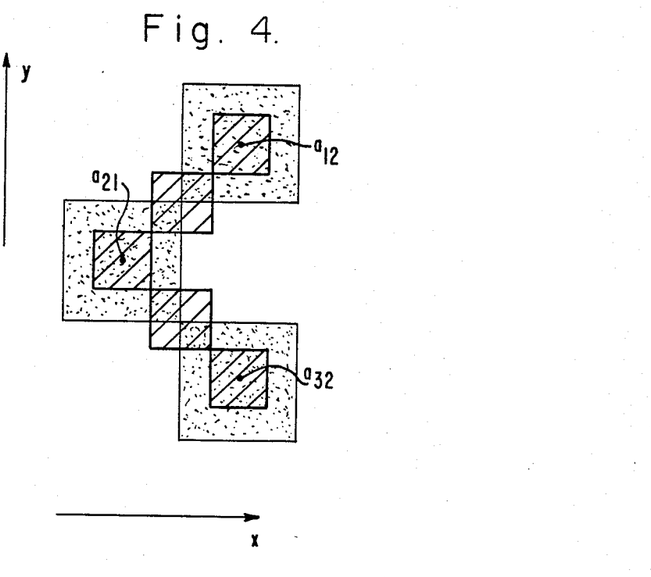
FIG. 4 illustrates an image interpolation technique which may be used in this invention in lieu of the multiple-registration technique of FIGS. 2a, 2b and 2c.

Referring to FIG. 4, a subpixel of video data is generated from a single video frame. The exemplary portion of the video frame a of FIG. 4 comprises a plurality of stored words of video data in which only the words corresponding to pixel center points $a_{12}$, $a_{21}$ and $a_{32}$ represent a non-zero intensity, corresponding to the shaded areas of the video frame a of FIG. 4.

Image interpolation is achieved by estimating the value of a point located between pixels. The image data is interpolated between the pixels to achieve a linear transition between the three points $a_{12}$, $a_{21}$ and $a_{32}$, as illustrated in FIG. 4 in the heavier solid line. The resulting interpolated image is represented in cross hatching in FIG. 4. The new interpolated image, corresponding to the crossed-hatched area, contains more information than the old image corresponding to the shaded or stippled area.

Interpolation of the analog intensity values among the subpixels in the shaded area is made in accordance with the following equations defining the intensity value of the data word representing a subpixel $a'_{ij}$:

$a'_{ij} = a_{ij}$ if $a_{ij}$ is the center point of a sample pixel in the original video frame a.
Otherwise:
$a'_{ij} = $ a linear interpolation between the analog values of adjacent $a_{ij}$ from the original video frame a.

Data from sampled video frames can update the estimates from previously interpolated subpixels if combined by a suitable weighting factor. The foregoing image interpolation and zoom techniques are well known and are described in various publications including, for example: Pratt, *Digital Image Processing*, Wiley & Sons, New York, pages 110–116. Accordingly, the image interpolation and zoom technique will not be described in greater detail here.

In summary, by the use of either multiple image registration or image interpolation and zoom, a video image comprising a plurality of fine subpixels may be constructed from a plurality of video frames comprising a plurality of normally sized pixels. A larger number of small detectors could also be used to improve sampling density. However, the information contained in the subpixel composite video frame is still blurred in accordance with the diffraction point spread function of the aperture through which the image was viewed. Accordingly, there remains the task of removing the blur, at least partially, from the image, and reconstructing an unblurred image from the information contained in the highly sampled video frame of subpixels.

Unblurring by Matched Filters

Figure 5:
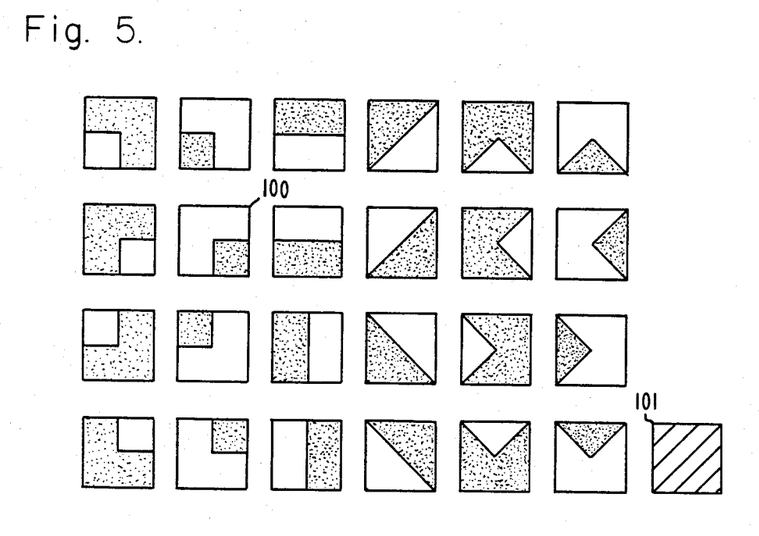
FIG. 5 illustrates an exemplary set of image primitives.

The composite image comprising a plurality of subpixels may be substantially unblurred by correlating each small segment of the composite blurred image with a complete set of equally small blurred image primitives. An exemplary set of 25 image primitives is illustrated in FIG. 5. Whenever a peak correlation is detected between a particular image primitive and a particular segment of the composite image, an equivalent unblurred image primitive is substituted in place of the blurred segment. In this manner, a synthesized reconstructed silhouette image is formed from a spatially correlated set of image primitives substituted in place of the original blurred image segments to which they correspond.

Before correlating the set of basic image primitives with the various segments of the blurred composite image, the image primitives themselves are first blurred by convolving them with the sensor degradation consisting of both the point spread function of the aperture, through which the original scene was viewed, and the detector shape, which samples the diffraction limited image. Accordingly, both the blurred composite image and the image primitives to which its segments are compared, are blurred by the same point spread function, thus enhancing correlation. This point spread function is a Bessel function defined by wavelength and the configuration of the aperture through which the scene is viewed, and may be computed in a deterministic manner in accordance with well known principles of classical optics. Blurring of the image primitives, such as those illustrated in FIG. 5 with the sensor degradation, is performed in accordance with well known principles of convolution theory.

Figure 6A:
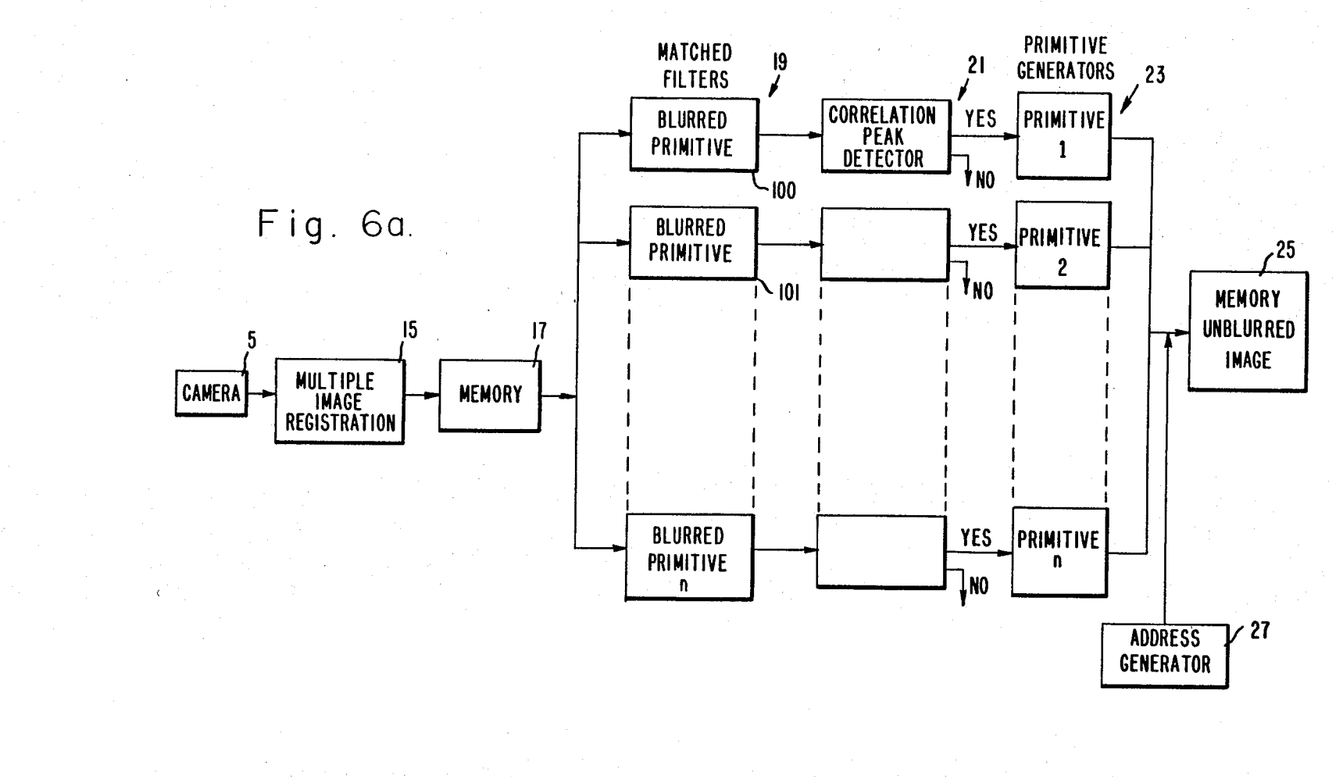
FIG. 6a illustrates the image primitive matched filter correlation technique for synthesizing an enhanced resolution image.

The foregoing process is illustrated schematically in FIG. 6a. The camera 5 generates video data which is fed to a multiple image generator 15 which functions in accordance with either the multiple image registration previously described in connection with FIGS. 2a, 2b, 2c or the image interpolation described in connection with FIG. 4. The generator 15 then feeds video data corresponding to a composite image of subpixels into a cumulative memory 17 which stores the combined video frame of subpixels. Segments of the video frame data stored in the memory 17 are then continuously fed to a set of parallel matched filters 19. Each of the matched filters 19 corresponds to a blurred version of one primitive of a complete set of image primitives such as those illustrated in FIG. 5. Correlation between each segment of the video frame and each of the matched filters is detected by a corresponding one of the correlation peak detectors 21.

If a particular one of the blurred primitives matches a particular segment of the video data read out from the memory 17, the corresponding one of the peak detectors 21 will enable the corresponding one of a plurality of primitive generators 23. The enabled primitive generator feeds the corresponding original (or unblurred) image primitive to a memory 25, the selected image primitive being stored in a location determined by an address generator 27. This location corresponds to the location of the matching segment of the original video frame stored in the memory 17. As a result, feeding a continuum of blurred image segments from the memory 17 through the matched filter 19 causes a new silhouette image to be synthesized in the memory 25 comprising a plurality of matching image primitives.

Figure 6B:
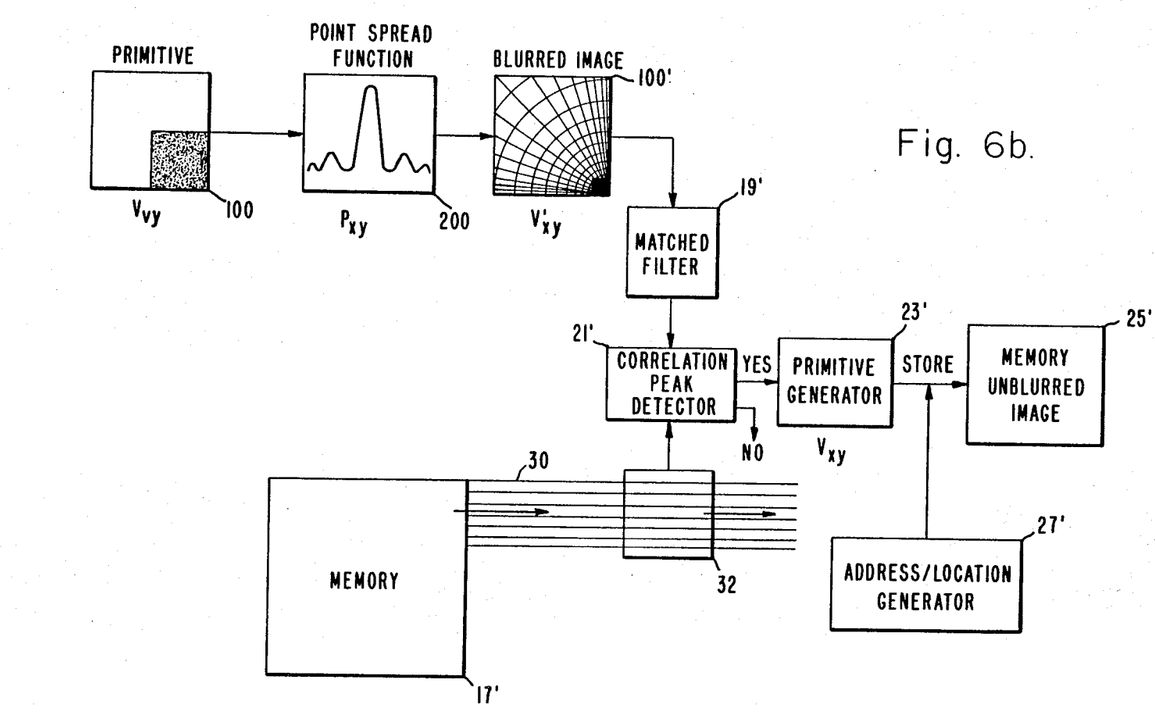
FIG. 6b illustrates the implementation of the technique of FIG. 6a for a single image primitive matched filter, as a simplified example.

It is contemplated that the correlation process of FIG. 6a may be carried out using a memory and a charge coupled device transversal filter system such as that illustrated in FIG. 6b. In FIG. 6b, memory 17' contains a plurality of pixels representing one frame of video data corresponding to the composite blurred image. The pixels are organized by row and column. Matched filter correlation of the type illustrated in FIG. 6a is implemented by the use of a charge coupled device transversal filter comprising a plurality of n-parallel charge coupled device serial registers 30. In the example of FIG. 6b, $n=6$.

The top six rows of the CCD memory 17' are transferred serially from left to right out of the memory 17', through the parallel CCD registers 30 and beneath a planar array 32 of charge sensing gate electrodes organized by n-rows and n-columns. This defines the dimensions of each of the segments of the video frame to be compared or matched as n pixels by n pixels. The n-rows of sensing gate electrodes in the array 32 are in vertical registration with the n-rows of the stored image 30. The spacing in the x direction in the gate electrodes in the array 32 corresponds to the serial spacing of charge packets in each of the image registers 30.

As the top six rows of data from the memory 17' are clocked from left to right through the CCD registers 30, successive segments of the video data comprising six rows and six columns are read out. Specifically, the magnitude of each charge packet in each six-by-six segment of data passing beneath the array 32 is sensed by sensing the electrical potential of each individual sensing gate electrode in the array 32. Each time data is clocked sequentially from left to right by one pixel through the register 32, a new segment of video data is read out from the array 32 and fed to a corresponding one of 21' of the correlation peak detectors 21. This occurs once each CCD clock cycle. The process continues, pixel by pixel, until the entire image has been processed. Operation of charge coupled device transversal filters of this sort is well known in the art and will not be described further. Charge coupled device image processing with transversal filters and CCD sense electrode arrays is described, for example, in: Nudd et al, "A CCD Image Processor for Smart Sensor Applications", *Proceedings of the Society of Photo-Optical Instrumentation Engineers,* San Diego, Calif., 1978, Vol. 155, pages 15-22.

Convolution and Correlation

Figure 6C:
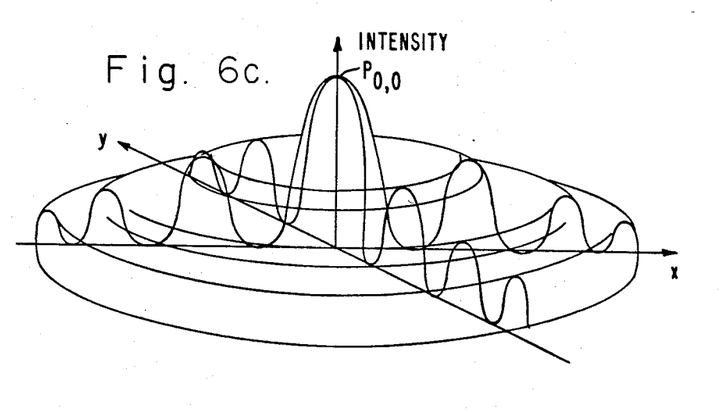
FIG. 6c illustrates a point spread function of the same function shown in FIG. 6b.

A simplified description of the convolution and correlation processes for a particular one of the image primitives of FIG. 6a will now be given with reference to FIG. 6b. Each image primitive of FIG. 5 is quantized into an array of n columns and n rows of data words, $V_{ij}$. A graphic representation of the array corresponding to the image primitive 100 of FIG. 5 is illustrated in FIG. 6b. An exemplary aperture point spread function $P_{xy}$ is illustrated in FIG. 6c. It may be digitized into an array of m rows and m columns of data words corresponding to the number of rows and columns of subpixels in a complete multiple-registered frame. The result is a matrix $P_{ij}$ of m columns and m rows of data words, comprising the point spread function matrix 200 indicated in FIG. 6b. The following is a partial representation of an exemplary point spread function matrix:

$$= \begin{matrix} \bullet & & & +.01 & & & \bullet \\ & \bullet & & -.2 & & \bullet & \\ & & -.6 & -.7 & -.6 & & \\ +.01 & -.2 & -.7 & 1 & -.7 & -.2 & +01 & \bullet \\ & & -.6 & -.7 & -.6 & & \\ & \bullet & & -.2 & & \bullet & \\ \bullet & & & +.01 & & & \bullet \\ & & & \bullet & & & \end{matrix}$$

In order to generate a blurred "version" of each image primitive such as the primitive 100 in FIG. 6b, the primitive 100 is convolved with the point spread function matrix 200, yielding the blurred primitive 100', as indicated in FIG. 6b. Each data word $V'_{ij}$ in the $i^{th}$ row and the $j^{th}$ column of the blurred primitive 100' is computed from the point spread function data words $P_{ij}$ and the unblurred primitive data words $V_{ij}$ as follows:

$$V'_{i,j} = \sum_k \sum_l P_{k-i,l-j} V_{kl}.$$

The blurred primitive 100' is then used as an array or matched filter 19' of n×n subpixels of data words. The plurality of matched filters 19 comprises, for example, each of the image primitives of FIG. 5 convolved with the point spread function 200, in accordance with FIG. 6b.

The n×n matched filter 19' is correlated with each n×n image segment sensed by the array 32, the correlation surface is operated on by the two-dimensional correlation peak detector 21'. If the detector 21' senses a peak correlation, the primitive generator 23' is enabled by the detector 21' to generate a block of n-rows and n-columns of data words corresponding to the unblurred image primitive 100. The data from the generator 23' is stored in the memory 25' in an address specified by the address generator 27'. The address generator 27' directs the image primitive block of data in the memory 25' to the location corresponding to the original location of the correlated data segment of the blurred video frame stored in the memory 17'.

Computation of the correlation by the detector 21' is performed in accordance with well-known correlation techniques in signal processing theory and, therefore, will not be described herein in detail.

The synthesized image stored in the memory 25 comprises a mosaic of selected image primitives and has a better resolution then any one of the video frames originally generated by the camera 5. It is contemplated that the performance may be enhanced by the use of a more complete set of image primitives than that illustrated in FIG. 5.

What is claimed is:

1. In an imaging system comprising an imager which may view a scene through an aperture characterized by a point spread function and means responding to said imager for generating successive frames of video data words characterized by a first sampling rate, a system for enhancing image resolution, comprising:

means for converting said video data words into a synthesized video frame of video data words, said synthesized video frame characterized by a second higher sampling rate;

a plurality of image primitives, each of said image primitives comprising a matrix of video data words;

means for convolving each of said image primitives with said point spread function to generate a set of blurred image primitives;

means for computing the correlation between each of said blurred image primitives and a segment of said synthesized video frame and detecting a peak correlation therefrom wherein said segment is a selected portion of said synthesized video frame;

a memory for storing a mosaic of selected image primitives; and means, responsive whenever said correlation means detects a two-dimensional peak correlation between a particular one of said blurred image primitives and one segment of said synthesized video frame, for writing a particular one of the unblurred ones of said image primitives into said image primitive mosaic storage memory at a location corresponding to the original location of said particular synthesized video frame segment in said synthesized video frame.

2. The system of claim 1 wherein said means for converting into a synthesized video frame comprises multiple image registration means for forming a mosaic of displaced ones of said successive video frames generated by said imager and said selected portion of said synthesized video frame is similar in size to the blurred primitives with which it is compared for purposes of computing correlation therebetween.

3. The system of claim 1 wherein said means for converting into a synthesized video frame comprises means for performing image interpolation in a single one of said successive video frames.

4. The system of claim 1 further comprising an array of detectors having a detector-to-detector sampling rate greater than the Nyguist rate.

5. The image system of claim 1 wherein each said small segment comprises n rows and n columns of said data words and said means for generating a synthesized video frame comprises a memory device for storing said synthesized video frame data words, and wherein said correlation means comprises a charge coupled device transversal filter including n-parallel registers receiving data from said charge coupled device memory, said correlation means comprising the equivalent of a planar array of n rows and n columns of sense electrodes overlying said parallel registers, said electrode array further comprising means for detecting each segment of video data words transferred through said parallel registers, and transmitting said detected video data words to a correlation computator, wherein said correlation computator computes a correlation between said detected segment of video data words and said digitized version of a corresponding one of said blurred image primitives.

6. In an imaging system, a method for employing a set of primitives to enhance an image whose resolution is degraded by system limitations including blurring caused by focus, diffraction and sampling, said method comprising:

generating a set to degraded primitives by degrading said primitives to the same extent as the image is degraded by said system limitations;

correlating the intensity distribution of a sampled segment of said degraded image with the intensity distributions of said degraded primitives and selecting the most correlated degraded primitive; and synthesizing an enhanced image by displaying the undegraded version of said selected degraded primitive at the image location where the best match occurs between said sampled degraded image segment and said selected degraded primitive.

7. The method of claim 6 further comprising the additional step of:

increasing the sampling density of the degraded image and the degraded primitives prior to comparing the intensity distributions of degraded primitives and sampled segments of said degraded image.

8. The method of claim 6 wherein the correlation of intensity distributions is made between sampled degraded image segments and degraded primitives of similar size to each other.

9. The method of claim 6 wherein said degraded primitives are generated mathematically by convolving said primitives with a function representing said system limitations.

10. The method of claim 6 wherein said sampled segments of said degraded image have overlapping portions.

* * * * *